(12) United States Patent
Sykora et al.

(10) Patent No.: US 9,234,739 B2
(45) Date of Patent: Jan. 12, 2016

(54) IN SITU CALIBRATION OF INTERFEROMETERS

(71) Applicant: Zygo Corporation, Middlefield, CT (US)

(72) Inventors: Daniel M. Sykora, Middletown, CT (US); Michael Kuechel, Oberkochen (DE)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 14/529,616

(22) Filed: Oct. 31, 2014

(65) Prior Publication Data

US 2015/0055139 A1 Feb. 26, 2015

Related U.S. Application Data

(62) Division of application No. 13/608,848, filed on Sep. 10, 2012, now Pat. No. 9,103,649.

(60) Provisional application No. 61/532,449, filed on Sep. 8, 2011.

(51) Int. Cl.
*G01B 11/02* (2006.01)
*G01B 9/02* (2006.01)
*G01B 11/24* (2006.01)

(52) U.S. Cl.
CPC .......... *G01B 9/02072* (2013.04); *G01B 9/0201* (2013.01); *G01B 9/02032* (2013.01); *G01B 9/02057* (2013.01); *G01B 9/02068* (2013.01); *G01B 11/2441* (2013.01)

(58) Field of Classification Search
CPC ............. G01B 9/02072; G01B 9/0201; G01B 9/02032; G01B 9/02057; G01B 9/02068; G01B 9/023; G01B 11/2441; G01J 2009/0223; G01J 2009/0238; G01M 11/005; G01M 11/02; G01M 11/025; G01M 11/0271
USPC ........................................................ 356/511
See application file for complete search history.

(56) References Cited

U.S. PATENT DOCUMENTS

| 4,201,473 A | 5/1980 | Domenicali et al. |
| 4,594,003 A | 6/1986 | Sommargren |
| 4,872,755 A | 10/1989 | Küchel |
| 5,361,312 A | 11/1994 | Küchel |

(Continued)

OTHER PUBLICATIONS

Deck, L., Environmentally Friendly Interferometry, 49th Annual Meeting, Denver, Proc. SPIE, (Aug. 2004).

(Continued)

*Primary Examiner* — Tarifur Chowdhury
*Assistant Examiner* — Jonathon Cook
(74) *Attorney, Agent, or Firm* — Fish & Richardson P.C.

(57) ABSTRACT

In-situ calibration of an interferometer includes making a sequence of phase measurements of a test object using the interferometer, each of the measurements having a same carrier fringe frequency, where at least some of the measurements are made at three or more different orientations of carrier fringes, and determining information about the test object based on at least some of the phase measurements, in which determining the information includes reducing errors in the measurements arising from imperfections in the interferometer based on the measurements made at the three or more different orientations.

11 Claims, 6 Drawing Sheets

(56) References Cited

U.S. PATENT DOCUMENTS

| | | | |
|---|---|---|---|
| 6,359,692 | B1 | 3/2002 | de Groot |
| 6,717,680 | B1 | 4/2004 | Kuchel et al. |
| 7,405,833 | B2 | 7/2008 | Smythe et al. |
| 7,417,743 | B2 | 8/2008 | de Groot et al. |
| 7,564,568 | B2 | 7/2009 | de Groot et al. |
| 2006/0098209 | A1 | 5/2006 | Smythe et al. |
| 2006/0187465 | A1* | 8/2006 | Groot ............... G01B 11/2441 356/512 |
| 2007/0002333 | A1* | 1/2007 | Ueki ..................... G01N 21/45 356/512 |
| 2008/0259348 | A1 | 10/2008 | Judell et al. |
| 2012/0307259 | A1 | 12/2012 | Leung et al. |

OTHER PUBLICATIONS

Küchel, M., The new Zeiss interferometer, Special Paper, Optical Testing and Metrology III: Recent Advances in Industrial Optical Inspection, San Diego, California, Proc. SPIE, 1332 :6655-663 (Jul. 1990).

Malacara, D., et al., Interferogram Analysis for Optical Testing, New York: Marcel Dekker, pp. 285-335 (1998).

Macy, Jr., William, W. "Two-dimensional fringe-pattern analysis," *Applied Optics*, 22.23 (1983):3898-3901.

Massig et al., Fringe-pattern analysis with high accuracy by use of the Fourier-transform method: theory and experimental tests, Appl. Opt. 40(13):2081-2088 (2001).

Roddier et al., Interferogram analysis using Fourier transform techniques, Appl. Opt. 26:1668-1673 (1987).

Takeda et al., Fourier transform profilometry for the automatic measurement of 3-D object shapes Appl. Opt. 22:3977-3982 (1983).

Takeda, M., et al. "Fourier-transform method of fringe-pattern analysis for computer-based topography and interferometry," *J. Opt. Soc. Am.* 72.1 (1982):156-160.

\* cited by examiner

IN SITU CALIBRATION OF INTERFEROMETERS

CROSS-REFERENCE TO RELATED APPLICATIONS

Under 35 U.S.C. §120, this application is a divisional of and claims benefit to U.S. application Ser. No. 13/608,848, filed on Sep. 10, 2012, which claims priority to U.S. Provisional Application No. 61/532,449. The contents of the prior applications are incorporated herein by reference in their entirety.

BACKGROUND

Interferometric optical techniques are widely used to characterize test surfaces.

For example, to measure the surface profile of a test surface, one can use an interferometer to combine a test wavefront reflected from the test surface with a reference wavefront reflected from a reference surface to form an optical interference pattern. Spatial variations in the intensity profile of the optical interference pattern correspond to phase differences between the combined test and reference wavefronts caused by variations in the profile of the test surface relative to the reference surface. Phase-shifting interferometry (PSI) can be used to accurately determine the phase differences and the corresponding profile of the test surface. The surface profile measurement of the test surface is relative to the surface profile of the reference surface, which is assumed to be perfect (e.g., flat) or known within the tolerances of the measurement.

With PSI, the optical interference pattern is recorded for each of multiple phase-shifts between the reference and test wavefronts to produce a series of optical interference patterns that span, for example, at least a half cycle of optical interference (e.g., from constructive, to destructive interference). The optical interference patterns define a series of intensity values for each spatial location of the pattern, wherein each series of intensity values has a sinusoidal dependence on the phase-shifts with a phase-offset equal to the phase difference between the combined test and reference wavefronts for that spatial location. Using numerical techniques known in the art, the phase-offset for each spatial location is extracted from the sinusoidal dependence of the intensity values to provide a profile of the test surface relative the reference surface. Such numerical techniques are generally referred to as phase-shifting algorithms.

The phase-shifts in PSI can be produced by changing the optical path length from the measurement surface to the interferometer relative to the optical path length from the reference surface to the interferometer. For example, the reference surface can be moved relative to the measurement surface. Alternatively, the phase-shifts can be introduced for a constant, non-zero optical path difference by changing the wavelength of the measurement and reference wavefronts. The latter application is known as wavelength tuning PSI and is described, e.g., in U.S. Pat. No. 4,594,003 to G.E. Sommargren.

One type of interferometer that is often used for characterizing a surface of a test object is a Fizeau interferometer. In many embodiments, phase shifting for object surface profiling proceeds by mechanical translation of the reference surface or by wavelength tuning, during which time a computer captures successive frames of an interference pattern at a detector for later analysis.

In certain cases, it is useful to operate an interferometer using single-frame data acquisition with short integration times, where environmental disturbances such as vibration and air turbulence are minimized and the acquisition of dynamically-changing events may be realized. In one embodiment, the requirement of multiple phase shifts across a single camera frame is accomplished by the introduction of dense carrier fringes. However, operating interferometers in a way to spatially encode the phase shifts required for single-frame data acquisition can, in some instances, introduce other errors known as "retrace errors." A retrace error occurs in a Fizeau-type interferometer, for example, when two interfering beams (e.g., a measurement beam and reference beam) depart from a common imaging path and, as a result, accumulate additional and differing phase contributions due to system design or spatially local imperfections in the traversed optical components. That is, a retrace error refers to a systematic error (e.g., accumulated phase difference).

SUMMARY

The present disclosure relates to in-situ calibration of interferometers. In particular implementations, the present disclosure relates to techniques for compensating optical imperfections in interferometers, including, but not limited to, carrier fringe methods. For example, techniques are disclosed in which a sequence of interferometric profile measurements are made, where the measurements are taken with at least three different orientations of tilt fringes, so as to allow for either (1) compensation of measurement errors arising from instrument imperfections, (2) calibration of the instrument for instrument imperfections, or both.

Implementations include, for example, taking three or more phase measurements of a test part, each of the measurements sharing a same absolute carrier fringe frequency but a different carrier fringe orientation (e.g., by repositioning a measurement beam spot in different locations of a field of view such that the orientation of the carrier fringes in an azimuthal direction is modified by steps of 90 degrees). The three or more phase measurements then can be combined in such a way that retrace errors of the interferometer arrangement are automatically corrected on a pixel level and a high accuracy surface map results. As a result of the correction, no new calibrations may be necessary for further measurements on the same type of test part, i.e., with the set-up now being calibrated, it may not be necessary to perform additional measurements in areas other than the last location of the beam spot during the calibration procedure. The result of the calibration is that not only aberrations from retrace errors are compensated, but even mid- and high-spatial imperfections from the imaging train of the interferometer can be largely reduced.

More generally, an innovative aspect of the subject matter described in this specification can be embodied in methods that include the actions of making a sequence of phase measurements of a test object using an interferometer, each of the measurements having a same carrier fringe frequency, where at least some of the measurements are made at three or more different orientations of carrier fringes, and determining information about the test object based on at least some of the phase measurements, in which determining the information includes reducing errors in the measurements arising from imperfections in the interferometer based on the measurements made at the three or more different orientations.

Other embodiments of this aspect include corresponding systems, apparatus, and computer program products encoded on computer-readable media, each operable to cause a data processing apparatus to perform the actions of the methods. A system of one or more computers can be configured to perform particular operations or actions by virtue of having software, firmware, hardware, or a combination of them installed on the system that in operation causes the system to perform the actions. One or more computer program products can be configured to perform particular operations or actions by virtue of including instructions that, when executed by data processing apparatus, cause the apparatus to perform the actions.

The foregoing and other embodiments can each optionally include one or more of the following features, alone or in combination. For example, reducing errors in the measurements can include calibrating the interferometer for the imperfections based on the measurements made at the three or more different orientations. In some implementations, reducing the errors includes combining measurements having the differing fringe orientations to reduce retrace errors. In some implementations, the actions further include varying a relative orientation between the test object and a reference surface to provide the different orientations of the carrier fringes. The actions can further include varying a location of a measurement beam spot in a field of view of the interferometer to provide the different orientations of the carrier fringes. In some implementations, the measurement beam spot is sequentially positioned in different positions of the field of view.

In some implementations, the interferometer is a Fizeau interferometer.

In some instances, the test object includes a planar surface, a spherical surface, or an aspherical surface.

Another innovative aspect of the subject matter described in this specification can be embodied in an interferometer system that includes a detector configured to obtain interferometry data from a test object surface, a data processing apparatus coupled to the detector, the data processing apparatus being configured to: obtain a sequence of phase map measurements of the test object from the detector, each of the measurements having a same carrier fringe frequency, where at least some of the measurements are made at three or more different orientations of carrier fringes; and determine information about the test object based on at least some of the phase map measurements, in which determining the information comprises reducing errors in the measurements arising from imperfections in the interferometer system based on the measurements made at the three or more different orientations.

The foregoing and other embodiments can each optionally include one or more of the following features, alone or in combination. For example, the interferometer system can further include an adjustable aperture stop, in which the data processing apparatus is further configured to control a position of the adjustable aperture stop to provide the different orientations of the carrier fringes. In some implementations, the adjustable aperture stop includes a first opening for passing a first beam reflected from the test object and a second opening for passing a second beam reflected from a reference surface. The interferometer can further include an alignment detector configured to image the first beam and the second beam. The data processing apparatus can be further configured to change the position of the adjustable aperture to sequentially pass the first beam in different positions of a field of view of the alignment detector. The data processing apparatus can be further configured to: output the field of view of the alignment detector to a display; generate a graphical user interface; and overlay the graphical user interface on the displayed field of view.

In some implementations, the interferometer is a Fizeau interferometer. The interferometer can further include a reference optic for forming a Fizeau cavity, in which the reference optic includes a planar surface, a spherical surface, or an aspherical surface.

In some implementations, the interferometer further includes a first mount to support the test object and a second mount to support a reference optic, in which an orientation of at least one of the first mount or the second mount is adjustable.

In some implementations, reducing errors in the measurements includes calibrating the interferometer for the imperfections based on the measurements made at so the three or more different orientations.

In some implementations, reducing the errors includes combining measurements having the differing fringe orientations to reduce retrace errors.

Particular implementations of the subject matter described in this specification can be implemented so as to realize one or more of the following advantages. For example, the subject matter disclosed herein enables the use of interferometers that operate with a large number (e.g., greater than 20) of tilt or carrier fringes. Additionally, the subject matter disclosed herein enable the use of interferometers that can perform single-camera frame data acquisition and analysis having short integration times, with reduced errors and improved measurement accuracy.

The details of one or more embodiments are set forth in the accompanying drawings and the description below. Other features and advantages will be apparent from the description, the drawings, and from the claims.

DETAILED DESCRIPTION

Embodiments described below include the calibration of optical interferometers such as phase-shifting interferometers (e.g., Fizeau interferometers, Michelson/Twyman-Green interferometers, Mach-Zehnder interferometer, Interference Microscopes). The calibration includes correcting for inherent errors in the interferometer such that more accurate measurements of test objects can be performed.

In certain implementations, the calibration procedures include using the interferometer to take measurements of optical interference patterns, each of which shares the same absolute carrier fringe frequency, but with different orientations of the fringes. In certain cases, the introduction of carrier fringes impart local and global phase imperfections on the measured interference pattern having a known frequency and orientation. When only a single frame of data of the interference pattern is available, one can use the carrier fringes to extract the measured phase, from which a calibration can be performed.

For example, for each calibration measurement, a measurement beam spot is moved during a coarse alignment to a different region of an alignment image, such that the carrier fringes in a corresponding interference pattern are rotated in an azimuthal direction (e.g., by steps of about 90 degrees for each rotation). In addition, for each measurement, a fine alignment is performed, after which a first type of error compensation is conducted to adjust for properties of a test surface as well as properties of the interferometer apparatus itself. The results of the measurements are then combined and a second type of error compensation is performed on a pixel level, thus enabling generation of a high accuracy surface map for the test object. In certain implementations, the calibration procedure compensates measurement aberrations resulting from wavefront errors, and/or errors resulting from mid- and high-spatial imperfections within the imaging train of the interferometer. Subsequent to the initial calibration, new test objects can be introduced to the interferometer for surface profiling measurements without requiring further calibration steps.

Figure 1:
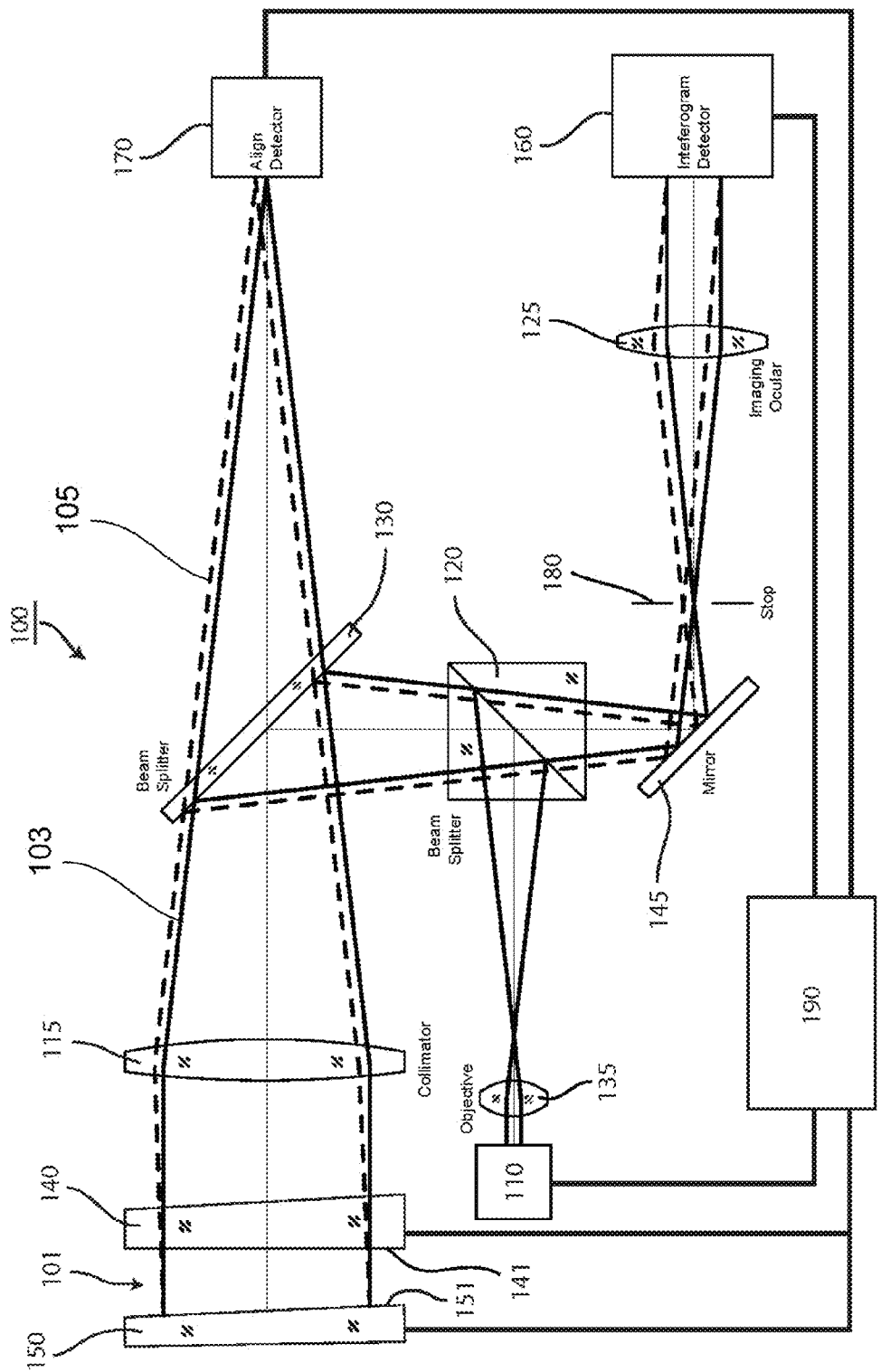
FIG. 1 is an example of an interferometry system.

Referring to FIG. 1, an example of an interferometry system 100 is shown that can be used to measure the optical interference produced by reflections from a reference surface 141 of a reference optic 140 and a test surface 151 of a test object 150. A coordinate system is shown for reference, where the z direction is parallel to an optical axis of interferometry system. Test object 150 and reference optic 140 may have various surface shapes including, for example, spherical surface, aspherical, planar, etc. In the example shown in FIG. 1, the region between reference surface 141 and test surface 151 defines a Fizeau cavity 101. System 100 also can include a mount (not shown) for supporting test object 150 relative to reference optic 140.

Interferometry system 100 also includes a first beam splitter 120 that redirects light emitted from a light source 110 (e.g., a laser diode, HeNe laser or the like) towards a second beam splitter 130 that redirects the light towards Fizeau cavity 101. First beam splitter 120 also transmits light reflected from Fizeau cavity 101 and beam splitter 130 toward an interferogram detector 160 (e.g., a CCD camera). Beam splitter 130 transmits a portion of the source light reflected from test and reference surfaces toward an alignment detector 170 (e.g., (e.g., a CCD camera). Here, the term "light" can refer to electromagnetic radiation in any of the ultraviolet, visible, near-infrared, and infrared spectral regions. As shown in the example of FIG. 1, the solid line 103 represents an outgoing illumination beam as well as the on-axis cavity reflection (in this example the reflection from reference optic 140). The dashed line 105 represents a tilted cavity reflection as would be used to generate carrier fringes at a detector (in this example by tilting the test surface)

As depicted in FIG. 1, interferometry system 100 also includes several optical components, including a collimating lens 115, that collimates diverging light from source 110 before the light is incident on test and reference surfaces, and an imaging ocular lens 125, which is used to image light reflected off of test and reference surfaces onto detector 160. System 100 also includes a source objective lens 135. In general, interferometry system 100 can include further optical components in addition to collimating lens 115, imaging ocular 125, and source objective lens 135.

Figure 2:
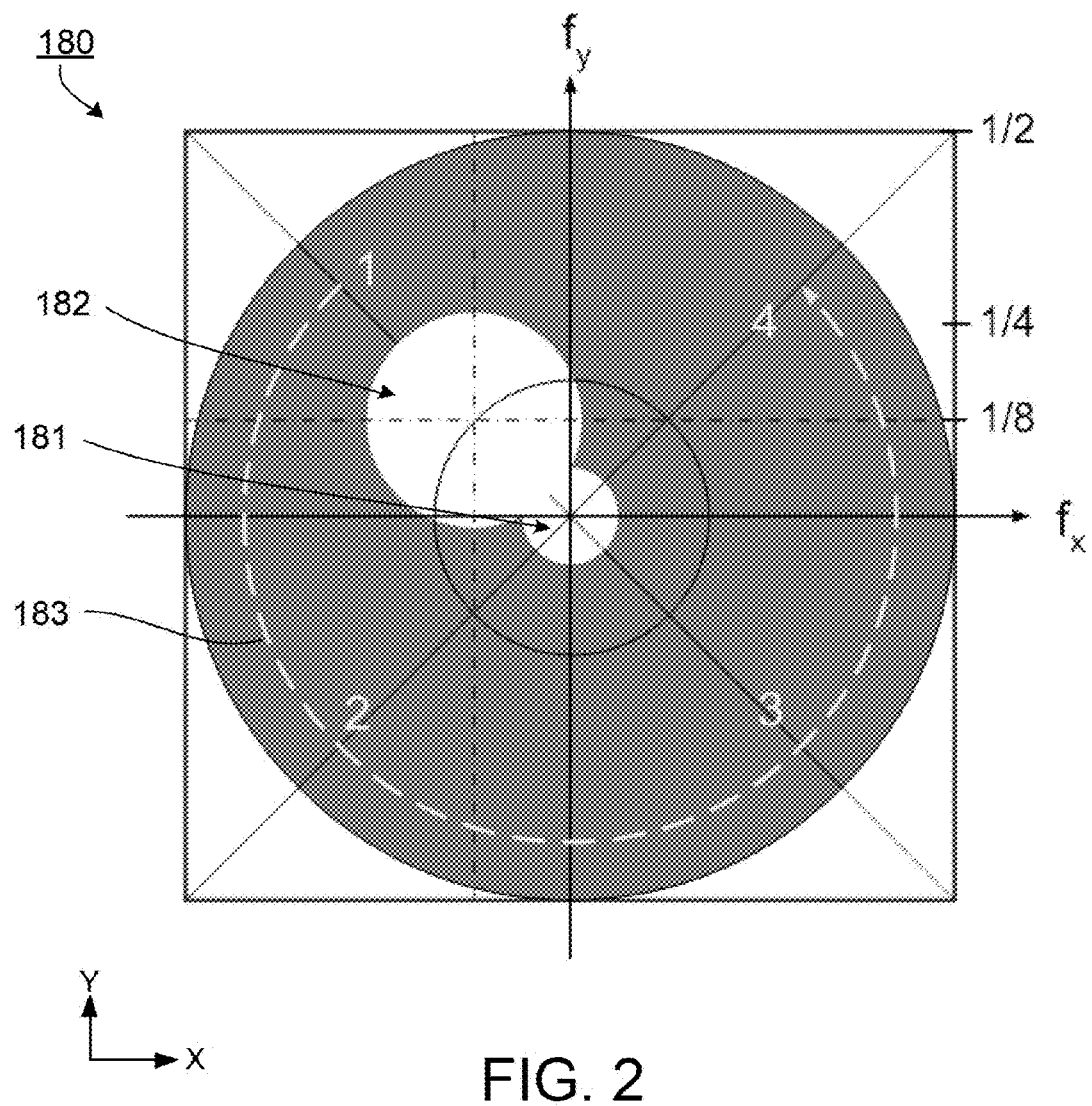
FIG. 2 a schematic diagram of a top view of an example of an aperture stop.

An adjustable aperture stop 180 is located between mirror 145 and imaging ocular lens 125, at a common focal plane of both mirror 145 and lens 125. In some implementations, aperture stop 180 can be rotated around the optical axis (e.g., the z-axis) to azimuthal positions. Aperture stop 180 can include multiple openings to allow light reflected from test object 150 and reference optic 140 to pass. FIG. 2 is a schematic diagram of a top view of an example of an aperture stop 180. The in-plane axes are labeled fx and fy and represent the spatial frequency along the x and y directions, respectively. For reference, several spatial frequencies in terms of fractional Nyquist (⅛, ¼, and ½) are listed at the outer frame surrounding aperture stop 180. As shown in FIG. 2, aperture stop 180 includes a first opening 181 and a second opening 182. The larger second opening 182 is for the off-axis test beam, whereas the smaller central opening 181 is for the reference beam. Aperture stop 180 is arranged within interferometry system 100 such that the center of first opening 181 is aligned with an optical axis (e.g., the z-axis) of the system 100. The center of second opening 182 is offset from the center of first opening 181 in a direction orthogonal to the optical axis. In the example of FIG. 2, first opening 181 is shown to have a circular area that is smaller than a circular area of second opening 182. Alternative configurations are also possible; for example, the area of second opening 182 can be smaller than the area of first opening 181. The larger opening is sized to pass substantially all spatial frequencies detectable from the test surface. On the other hand, the smaller opening is sized to limit undesirable spatial frequencies from the reference surface in order to lower uncertainty when measuring surface properties of the test object. There is an offset between the center axes of the openings because the test surface is tilted during operation to introduce a carrier fringes with spatial frequency at the center of the larger opening. The radial position of the opening is calculated based on the intended carrier fringe frequency. Although shown as circular in shape, the openings can be formed to have other shapes as well.

Aperture stop 180 can be rotated into multiple positions. For example, the frame shown in FIG. 2 is separated into four different quadrants, labeled "1," "2," "3," and "4." As aperture stop 180 is rotated through the different quadrants (e.g., in the direction of dashed arrow 183), the position of second opening 182 within the x-y plane also changes.

Referring again to FIG. 1, during operation of interferometry system 100, source 110 illuminates beam splitters 120 and 130, which reflect a portion of the illumination towards Fizeau cavity 101. Since reference optic 140 is operable to partially transmit and partially reflect light having the wavelength of the source light, the illumination is partly transmitted by reference optic 140 and reflects from surface 151 of test object 150. In addition, a portion of the illumination incident on reference optic 140 from beam splitter 120 is reflected by reference surface 141. The light reflected from reference surface 141 and from test object surface 151 propagates along a common path from Fizeau cavity 101 back through second beam splitter 130 onto alignment detector 170. In particular, alignment detector 170 images two separate beam spots: a first beam spot (e.g., a reference beam spot) corresponding to light reflected from reference surface 141 and a second beam spot (e.g., a measurement beam spot) corresponding to light reflected from test object surface 151.

Another portion of illumination reflected from reference surface 141 and from test object surface 151 reflects off of beam splitter 130 and propagates through first beam splitter 120 and reflects off of mirror 145 to interferogram detector 160. Wavefronts incident on interferogram detector 160 from reference surface 141 and test object surface 151 interfere, producing a pattern of fringes of varying intensity. Interferogram detector 160 is configured to generate an interference signal (interferogram) representative of the interference pattern.

Interferometry system 100 includes a data processing apparatus, such as a general purpose programmable computer 190, having one or more electronic controllers (not shown) in communication with interferogram detector 160 and alignment detector 170. Each electronic controller can be a component of computer 190 or can be provided as a separate device coupled to computer 190. Furthermore, each electronic controller includes a frame grabber for storing images detected by the detector to which the controller is coupled. Computer 190 can analyze the images stored by their corresponding frame grabber, and provide the user with surface profile information about test surface 151 based on the analysis. Information about a test object or test surface that can be determined from phase-shifted interferometry data includes, for example, information related to a spatial property (e.g., a height such as relative height) of one or more spatial locations of the test object. Examples of information related to a spatial property (e.g., height) of a test object include an OPD (e.g., an OPD corresponding to a spatial location of the test object) and a phase of interference.

System 100 also includes one or more adjustable mounts (not shown) for positioning test object 150 and reference object 140 relative to one another. Computer 190 can include an electronic stage controller (not shown) coupled to the adjustable mounts for controlling mount position. For example, in some implementations, computer 190 can send instructions to stage controller to move an adjustable mount laterally (e.g., along the x- or y-directions) and/or along the optical axis (e.g., along the z-direction). In some implementations, computer 190 can direct stage controller to modify the orientation of an adjustable mount, e.g., so that surface 151 is tilted with respect to the path of illumination reflected from reference surface 141 (or so that reference surface 141 is tilted with respect to test object surface 151). In certain implementations, tilting test object 150 and/or reference optic 140 can cause spatial carrier fringes to form in the interference pattern generated at detector 160. Interferometer system 100 also can optionally combine a diffuse screen and imaging relay lens together with alignment detector 170 to indirectly image the alignment field of view.

To provide for interaction with a user and to view image data obtained by alignment detector 170 and/or interferogram detector 160, computer 190 also includes one or more displays (e.g., flat panel display or monitor) and a keyboard and a pointing device, e.g., a mouse or a trackball, by which the user can provide input to computer 190. In some implementations, computer 190 stores in memory a calibration program for performing calibration of the interferometer setup.

System 100 also can include a source driver connected to light source 110 for adjusting the optical frequency v of its output. Source driver tunes the optical frequency v of light emitted from light source 140 at a desired tuning rate, $\dot{v}$, through a frequency range $\Delta v$ about a nominal optical frequency of $v_0$.

In some implementations, determining a surface profile of test object surface 151 using interferometry system 100 involves a two-step process: one interferometer measurement without the test object 151 and one measurement with the test object 151. For each measurement, computer 190 determines an interference phase, $\theta$, and a signal modulation, M, for the image data at each detector pixel.

One way to extract phase information from each measurement is to perform a spatial Fourier transform of the interference pattern and subsequently identify a carrier fringe frequency with a digital filter in the frequency domain. An inverse transform of the filtered spectrum provides the phase $\theta$ and signal modulation M information at each pixel. Phase extraction methods using Fourier transforms are described, for example, by W. Macy in "Two Dimensional Fringe Pattern Analysis," *Appl. Opt.*, 22, pp. 3898-3901 (1983), and by M. Takeda. I. Hideki, and S. Kobayashi, in "Fourier-transform method of fringe-pattern analysis for computer based topography and interferometry," *J. Opt. Soc. Am.* 72, pp. 156-160 (1982), each of which is incorporated herein by reference in its entirety.

Further information about potential interferometer configurations that can be used with the calibration procedure detailed in this disclosure and their uses can be found, for example, in U.S. Pat. Nos. 7,405,833, 7,417,743, 7,564,568, 6,359,692, and 6,717,680, each of which is incorporated herein by reference in its entirety.

Test Object Alignment

An example of a process for calibrating an interferometer is described below with reference to the Fizeau-type interferometer 100 of FIG. 1, except that test object 150 has a spherical surface and reference optic 140 is a transmission sphere (TS). The calibration procedure in this example is performed for the specific case of a test object having a curved surface, and four different aperture stop positions. However, the procedure can be readily extended to any number of aperture stop positions, can include test objects having non-spherical shapes, and can be applied to interferometers other than Fizeau-type interferometers (e.g., Michelson/Twyman-Green interferometers, Mach-Zehnder interferometers, and Interference Microscopes). Generally, the error correction/calibration procedure includes sequentially positioning a measurement beam spot in different areas of the alignment camera field of view and obtaining, at each position, an interferometric profile measurement. For each interferometric profile measurement, a relative orientation between the reference optic and the test object is adjusted to match a targeted interference fringe density and orientation, and a phase measurement of the modified interference profile is recorded. After recording the phase measurement at the final beam spot position, a pixel-wise retrace error correction is performed.

Figure 3:
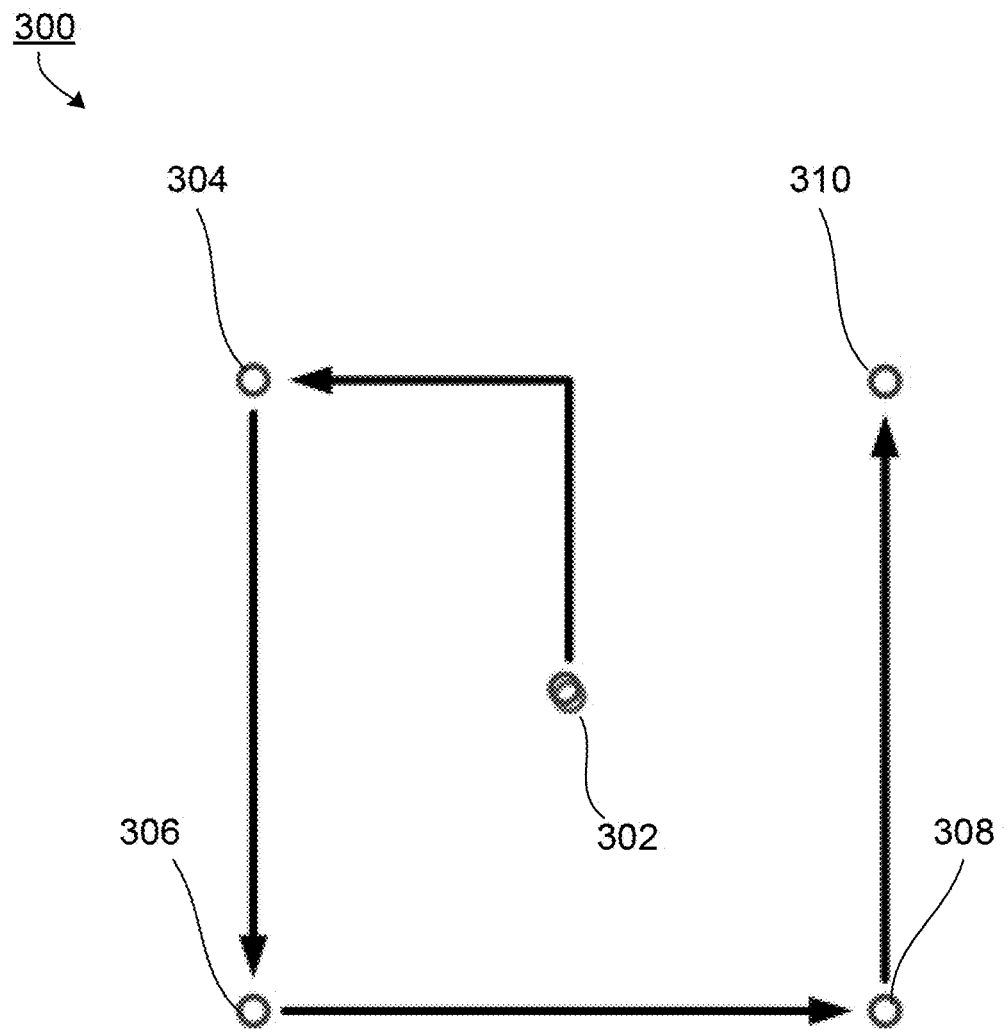
FIG. 3 is a schematic diagram of an example of an alignment window used for calibration of an interferometer system.

A user begins the calibration procedure by activating a calibration program stored on computer 190. Upon activation of the calibration program, an alignment window is output to the computer display. FIG. 3 shows an example of an alignment window 300 used for calibration of interferometer system 100. Alignment window 300 includes a computer-generated display that overlays a field of view of alignment detector 170. In other words, the image depicted in alignment window 300 is a real-time merged image from two separate sources. During operation of interferometer 100, the output from alignment detector 170 includes an image of two beam spots (e.g., approximately circular areas of high light intensity) incident on a light sensitive surface of detector 170. A first beam spot corresponds to reference light reflected from reference surface 141, whereas a second beam spot corresponds to light reflected off of test object surface 151. The computer-generated display portion of alignment window 300 includes multiple markers (e.g., arrows, circles, numbers) that are superimposed over the output image from detector 170. For clarity, only the computer-generated portion of alignment window 300 is shown in FIG. 3.

In some implementations, alignment window 300 may change its appearance during the calibration procedure. For example, the markers may change color, blink, appear or disappear. The visual changes in the markers are conditioned by the progress of the alignment and in-situ calibration measurement, i.e., the changes are event driven. In the present example, alignment window 300 initially includes 5 separate visible markers. A first marker 302 is depicted as the number "0" and is located in the center of alignment window 300. A second marker 304 and third marker 306 are depicted using the numbers "1" and "2" and are located in the top left corner and bottom left corner, respectively, of alignment window 300. A fourth marker 308 and fifth marker 310 are depicted using the numbers "3" and "4" and are located in the bottom right corner and top right corner, respectively, of alignment window 300.

Once alignment window 300 is displayed, a user performs a coarse alignment of the reference and measurement beam spots passing through first opening 181 so that both beam spots are coincident with a first marker 302. Beam spot alignment can be controlled by adjusting the test object or reference optic angle of tilt. For example, test object 150 or reference optic 140 can be tilted about either the x or y axes. When a planar test object is used, motion of test object 150 is restricted to tilting along x or y directions. When a spherical or aspherical test object is used, however, test object 150 can be repositioned laterally along x, y, and z in addition to tilt in x and y to adjust beam spot position. Motion for reference optic 140 is typically, but not always, restricted to tilt in x and y for the purpose of adjusting beam spot position. In all cases, z-axis adjustment of test object 150 or reference optic 140 may be required to minimize measurement beam and reference beam spot size.

In some implementations, the user manually adjusts the tilt angle. In other implementations, computer 190 automatically adjusts the tilt angle through the use of image processing techniques to identify the location of the beam spots within the image and then by directly controlling the mounts on which the reference optic 140 and test object 150 are positioned. So long as aperture stop 180 has an opening on its central axis, it can be rotated to any position around the optical axis. This is because both the measurement and reference beams are aligned along the optical axis (i.e., no dashed lines in the FIG. 1) and pass through the center of the stop.

Once coarse alignment is obtained, the beam spots undergo a fine alignment. Fine alignment is performed using the interference fringe pattern as a guide. The interference fringe pattern can be displayed within the same screen as alignment window 300 or in a separate display coupled to computer 190. The fringe pattern displayed by computer 190 represents the actual detected fringe pattern. Since the fringes in the pattern are, to first order, the result of alignment between surface 141 and surface 151, the fringe pattern may initially exhibit tilt components. Tilt components are straight line sinusoidal fringes that arise when surfaces 141 and 151 are tilted with respect to each other.

Figure 4:
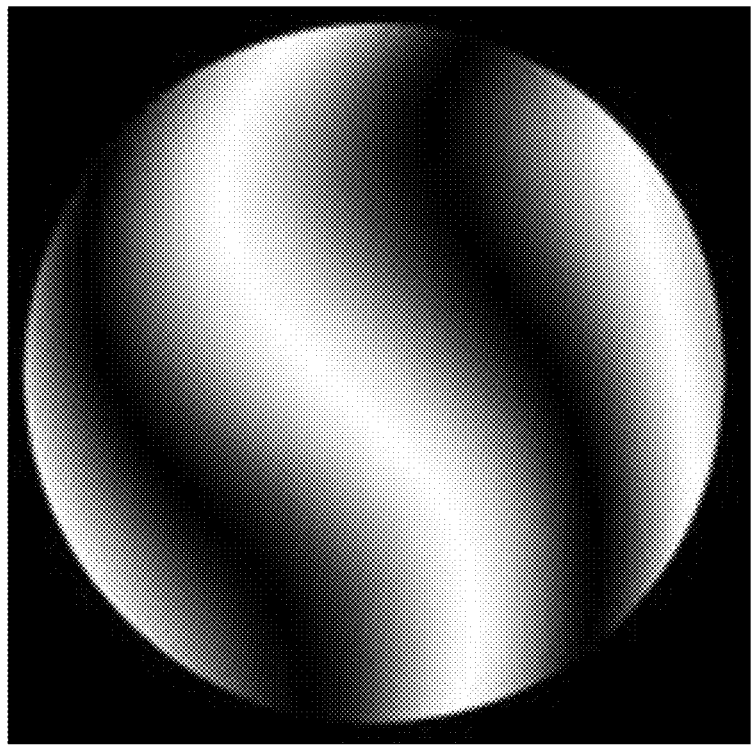
FIG. 4 is an example image of an interference fringe pattern.

The goal for fine alignment when viewing the fringe pattern is to make the fringes as wide as possible. That is, Fizeau cavity 101 should be "nulled" such that the displayed fringes no longer show tilt components. A nulled cavity is a common way to describe an interferogram that has substantially no visually distinguishable straight line sinusoidal tilt fringes present. The closer a cavity gets to null, the wider the tilt components become. An example of a fringe pattern image close to null is shown in FIG. 4. As with coarse alignment, the fine alignment can be performed manually by the user or automatically by computer 190. In the case of manual fine alignment, the user can adjust the tilt of reference optic 140 or test object 150 to change the width of the fringes visible on the screen. With automatic fine alignment, computer 190 can employ image-processing software to identify the width of each fringe and to automatically adjust the tilt of reference optic 140 or test object 150. Once the cavity is nulled, computer 190 may record an image of the interferogram to memory.

Once fine alignment for first marker 302 has been achieved, the user can initiate the next step in the calibration procedure. For example, in some implementations, the user selects second marker 304 (e.g., using a point and click feature with a mouse or touchpad). Upon selecting second marker 304, alignment window 300 may exhibit one or more graphical changes to at least one of the markers in the display. For example, second marker 304 may begin to blink, after which an arrow 303 extending from first marker 302 to second marker 304 may appear on the screen. The changes to the user interface of alignment window 300 are indicators notifying the user that aperture stop 180 is transitioning to a new position for a new measurement.

For example, upon selecting second marker 304, aperture stop 180 is rotated around the optical axis (e.g., the z-axis) into position 1 as shown in FIG. 2 from some initial indexed position. Rotation of aperture stop 108 can be performed automatically by interferometer system 100. In the present example, aperture stop 180 is rotated such that an imaginary straight line extending through the centers of both first opening 181 and second opening 182 is oriented at a 45 degree angle within a first quadrant labeled "1" (see FIG. 2). Thus, for each step in the calibration procedure, second opening 182 in aperture stop 180 is located in the same relative position as a corresponding marker in the alignment window 300 for that particular stage. For example, alignment window 300 shows markers 304, 306, 308, and 310 arranged symmetrically around first marker 302, in such a way that a position of each of markers 304, 306, 308, and 310 corresponds to a different quadrant. When the user proceeds through the calibration procedure in a counter-clockwise fashion from marker 304 to marker 310, aperture stop 180 is also rotated counter-clockwise through quadrants 1 through 4 shown in FIG. 2. As a result, the measurement beam spot passing through second opening 182 can easily be aligned with the corresponding marker at each stage of calibration.

Once aperture stop 180 is located in the new position, the tilt of test object 150 (or reference optic 140) is adjusted such that the measurement beam spot passing through second opening 182 of aperture stop 180 is coincident with second marker 304 in alignment window 300 for coarse alignment. The fringe pattern now displayed by computer 190 is not necessarily the actual interference fringe pattern produced at interferogram detector 160. Instead, the interference fringe pattern displayed on the screen may be an artificially generated fringe pattern produced by computer 190 that represents a difference between the detected fringe pattern at detector 160 and an ideal fringe pattern calculated by computer 190. The ideal fringe pattern is calculated based on a pre-configured and targeted tilt fringe spatial frequency for marker 304. That is, the ideal fringes include a specific number and orientation of carrier fringes, which are defined by position 182 in aperture stop 180. The fringe number and orientation can be pre-stored in memory of computer 190. As before, the tilt adjustment can be performed manually by the user or automatically by computer 190 using image-processing techniques in association with the electronic controller coupled to the test object mount or reference optic mount with the goal of making the artificial fringes as wide as possible.

At this stage, the accumulated retrace errors are roughly compensated in real-time using a Zernike polynomial. In some implementations, the approximate compensation is based on Zernike terms from a Zernike polynomial and enables the display of artificial fringes that closely resemble the true cavity interference fringes. The compensating Zernike terms scale with spatial frequency and orientation of the interference fringes and are based on system modeling of nominal optical prescriptions or preliminary global calculations based on two or more measurements. Zernike polynomials are ideally suited for this purpose as they accurately describe the types of retrace errors that can be estimated at this point. This approximate compensation step takes into account the type of test object surface used (e.g., radius of curvature of the test surface) as well as the type of the lens used for reference optic 140 (e.g., whether reference optic 140 is a transmission sphere lens or a planar lens), and corrects for global figure errors induced by the retrace errors (e.g., comatic and/or astigmatic aberrations). By fine aligning the test object surface (or reference optic surface), the artificial fringe pattern can be made as broad as possible and will look like the original fringe pattern obtained when aperture stop 180 was located at position "0," corresponding to first marker 302. Though the foregoing approximation is performed using Zernike terms, the approximation could be performed using any suitable polynomial expansion ortho-normal over a unit circle.

When the fringes are substantially free of any visual indication of tilt components (i.e., the fringes have substantially the maximum width possible), a set of phase-measurements of the fringe pattern can be taken. For example, computer 190, using image-processing techniques, identifies and records a phase of the artificial fringe pattern produced on the screen, and stores the recorded values in memory. In some implementations, the phase-measurements are obtained at a rate that is substantially equal to the camera frame rate for detector 160. For example, the phase measurements can be obtained at a frequency equal to at least 30 Hz. With such a high frequency of individual measurements, the phase measurements can be averaged in a short time frame. For example, in some implementations, 300 measurements, 400 measurements, or 500 measurements can be obtained within 10 seconds. In some implementations, the number of phase measurements obtained by computer 190 is pre-defined by the calibration software and/or by the user. In addition to the frame rate of detector 160, the precise measurement frequency depends on additional factors, including, for example, the hardware and software components installed on computer 190.

Subsequent to obtaining the interference fringe phase-measurements, computer 190 proceeds to the next step in the calibration process. In some implementations, computer 190 induces a change in the graphics displayed by alignment window 300 to indicate progression to the next step. For example, computer 190 can modify the appearance of second marker 304 (e.g., changing color from red to green) to indicate that that alignment at that position has been completed, while also changing the appearance of third marker 306 (e.g., inducing marker 306 to blink, changing color of marker 306 to red, and/or displaying an arrow from second marker 304 to third marker 306) to indicate that alignment of third marker 306 has begun.

At this time, aperture stop 180 is again rotated (e.g., by about 90 degrees) so that the majority of second opening 182 is located in quadrant "2" (see FIG. 2). Again, a tilt angle of test object 150 (or reference optic 140) is adjusted so the measurement beam spot, which passes through second opening 182 of aperture stop 180, is coincident with third marker 306 in alignment window 300. As before, the tilt adjustment can be performed manually by the user or automatically by computer 190. Subsequent to the coarse alignment, computer 190 may display artificial interference fringes for the new position of aperture stop 180 and the measurement beam spot. As before, computer 190 approximates a retrace error correction to the displayed artificial fringes based on Zernike polynomials. A user (or computer 190) then adjusts the test object (or reference optic) tilt to maximize the fringe width. Once the maximum fringe width is obtained, phase measurements (e.g., a phase map) of the modified fringes are calculated and stored in memory, and the number of phase measurements performed can be pre-defined by the calibration program or set by the user.

The above-described procedure, which includes aperture stop rotation, rough alignment, retrace error compensation, fine alignment, and phase measurement, is repeated for fourth marker 308 and fifth marker 310. The approximate retrace correction may be similar at each marker, but is fundamentally independent for each successive correction.

Once the final adjustment is performed with respect to fifth marker 310, the information obtained from the previous phase measurements can be used to perform a pixel-wise calibration of the retrace errors, including errors that stem from distortion in the imaging train. In pixel-wise calibration, each phase map acquired (e.g., at markers 304,306,308,310) is used to solve a system of equations that establishes a continuous pixel-wise model of retrace versus slope (i.e., tilt). In this way, subsequent corrections are applied individually for each pixel based on the local slope detected. Using the pixel-wise calibration procedure, even errors caused by local imperfections within the lenses of the mainframe, like striae, can be substantially reduced in certain implementations. In addition, the pixel-wise correction can be applied to subsequent interferometer measurements of similarly shaped test objects when the measurements are carried out with the measurement beam spot located at the last position in the calibration procedure (e.g., at fifth marker 310). For example, in some implementations, if a new test object sharing the same radius of curvature as the calibration test object is placed on the mount in the same position as the calibration test object, a user can use the interferometer to obtain surface measurements of the new test object without the need for any additional calibration steps (assuming the same zoom magnification is used and the cavity length is approximately the same).

Thus, the foregoing alignment and calibration steps can, in some implementations, be used to (1) obtain a substantially error free measurement of a test object's surface and (2) provide an effective retrace error correction, which can be applied to new test objects without the need to recalibrate the interferometer measurement software. To avoid repositioning new test objects to within pixel accuracy of the test object used for the initial calibration, extrapolation of the retrace correction to pixels outside of the calibration area may be required. Alternatively, or in addition, kinematic mounting schemes may be introduced to reposition subsequent parts.

Pixel-Wise Retrace Error Correction

An example of the process for deriving the pixel-wise retrace error correction from the phase-maps measured at the different beam spot positions (e.g., second marker 304 through fifth marker 310) will now be described. Though the pixel-wise calibration discussed below relies on phase measurements of the carrier fringes at four different orientations, the calibration requires phase measurements for at least three different carrier fringe orientations to solve the system of equations. However, any number of phase measurements greater than three can be used depending on the system of equations chosen for calibration, and, in some implementations, the greater the number of phase measurements, the more reliable and precise the calibration becomes.

Figure 5:
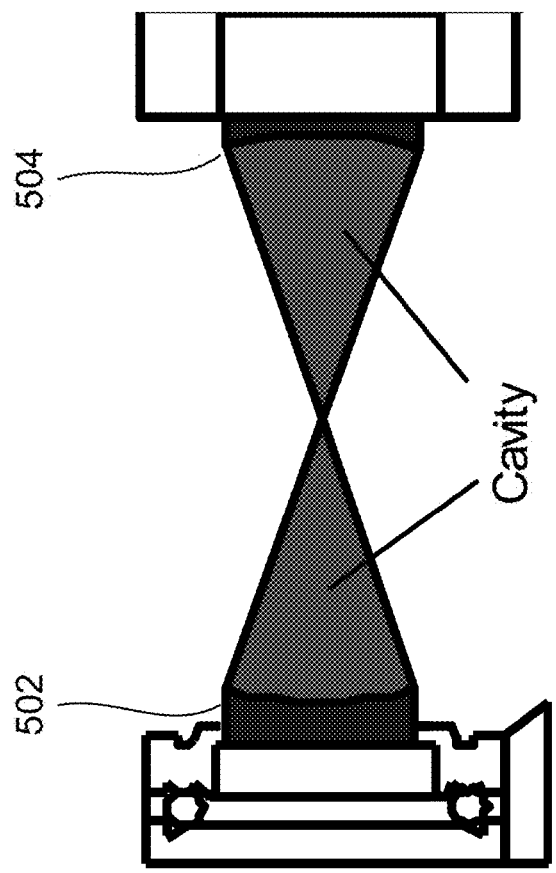
FIG. 5 is a schematic depicting an example of an interferometer system including a test object with a spherical surface and a transmission sphere reference optic.

For this example, it is assumed test object 150 has a spherical surface and reference optic 140 is a transmission sphere (TS lens). An example of a Fizeau cavity containing a concave test object 502 and TS lens 504 is shown in the schematic of FIG. 5. The phase values, which are represented by valid pixels that define the mask area, are embedded in matrices, where the number of matrices employed corresponds to the number of different beam spots used for alignment (e.g., four matrices are used when phase maps for four different beam spot positions are measured). The mask area refers to contiguous area(s) on interferogram detector 160 where valid phase data is acquired. The phase values are abbreviated with the letter $\phi(x,y)$, where x and y are interferogram detector coordinates. For a pixilated detector, the variables x and y can also be seen as integer numbers, "counting" the pixels or, equivalently, the rows and columns of the matrix in which the result is presented. Matrix entries outside the mask area correspond to numeric data type values representing an undefined or unrepresentable value (e.g., not a number (NaN) values).

Dividing the phase values by $2\pi$ and multiplying with the wavelength is used for the measurement gives the measured wavefront-deviation in lengths units, which is the optical path difference between the reference beam being reflected on the Fizeau surface (e.g., reference optic surface facing the test object surface) and the test beam being reflected on the test object surface. The parameter $n(x, y)$ is used to describe that optical path length deviation:

$$n(x,y) = \phi(x,y)/2\pi \cdot \lambda \quad (1)$$

The path difference defined in equation (1) is directly measured using interferometry prior to any corrections. The quantity $n(x, y)$ is a sum of several contributions, and we establish now a model that together with the phase measurements in the different quadrants of the alignment window allow us the useful separation of several of these contributions.

The first contribution is the sum of the topographic height differences of the reference optic surface and the test object surface from a perfect sphere. This contribution is a constant value $S(x, y)$. That is, the contribution is constant with respect to time and/or alignment. In particular, the contribution is independent from the exact alignment of the two surfaces with respect to each other in the cavity, where the "ideal" alignment would be such that the center points of the two surfaces would coincide (see FIG. 5). With such an alignment, a broad fringe pattern would be obtained. For the different alignments characterized in FIG. 2 at the marker locations 304, 306, 308, and 310, four different dense fringe patterns result, and the extra contribution from the tip and tilt of these alignments can be described by an equation such as:

$$T(x,y) = a \cdot x + b \cdot y \quad (2a).$$

In the case of an additional axial shift of the test surface (e.g., along the z-axis), the fringes are "bent" and an additional height difference is introduced in the Fizeau cavity, which is dependent on $h^2 = x^2 + y^2$ so that the complete rigid-body orientation contribution to the optical path difference of the alignment in the Fizeau cavity can be described by:

$$T(x,y) = a \cdot x + b \cdot y + d \cdot (x^2 + y^2) \quad (2b).$$

In the case of a plane cavity, a formula such as that set forth in equation (2a) would apply because the coefficient d would be zero, whereas in the case of a spherical cavity, a formula such as that set forth in equation (2b) would apply; therefore the same letter parameter $T(x, y)$ is used. In some implementations, a method to determine the rigid-body coefficients $a_i$, $b_i$, $d_i$ for each measurement $n_i(x, y)$ includes applying a least-squares fitting to the measured optical path differences $n_i(x, y)$. For a flat, the fitted surface is a simple plane, whereas for a sphere the fit would be a tilted sphere, under the assumption that the focus term itself is not of interest to the surface metrology of the sphere.

In an example where there are four different alignment positions, four sets of coefficients $a_i$, $b_i$, $d_i$, with i=1.4 can be obtained. It should be noted that coefficients $a_i$, $b_i$, $d_i$ are global in x and y (i.e., the coefficients apply globally to each acquired phase map with coordinates x, y; however, each of the phase maps will have a different set of values for the coefficients), but individual for each one of the four complete optical path length maps $n_i(x, y)$, whereas the contributions $S(x, y)$ from the surface topography is individual for every pixel but global for the four maps. Similarly, for the last contribution, the slope dependent retrace errors are individual for every pixel (x, y) and individual for each of the four measurements.

A linear dependency of the retrace errors from the surface tilt around the x and y axes is assumed. A strong linear dependency is typical on rigid-body errors arising primarily from mapping errors (or distortion); for these terms "coma" error is the dominant contributor.

Due to these facts, the coefficients $a_i$, $b_i$, $d_i$ are first determined for each of the different measurements $n_i(x, y)$. Knowing the coefficients, the functions $T_i(x, y)$ are subtracted from the measured optical path differences $n_i(x, y)$. This leads to the following set of equations (e.g., four equations result when four different phase maps are obtained):

$$S(x, y) + \frac{\partial n_1(x, y)}{\partial x} \cdot C_x(x, y) + \frac{\partial n_1(x, y)}{\partial y} \cdot C_y(x, y) = \quad (3a)$$
$$n_1(x, y) - T_1(x, y)$$

$$S(x, y) + \frac{\partial n_2(x, y)}{\partial x} \cdot C_x(x, y) + \frac{\partial n_2(x, y)}{\partial y} \cdot C_y(x, y) = \quad (3b)$$
$$n_2(x, y) - T_2(x, y)$$

$$S(x, y) + \frac{\partial n_3(x, y)}{\partial x} \cdot C_x(x, y) + \frac{\partial n_3(x, y)}{\partial y} \cdot C_y(x, y) = \quad (3c)$$
$$n_3(x, y) - T_3(x, y)$$

$$S(x, y) + \frac{\partial n_4(x, y)}{\partial x} \cdot C_x(x, y) + \frac{\partial n_4(x, y)}{\partial y} \cdot C_y(x, y) = \quad (3d)$$
$$n_4(x, y) - T_4(x, y)$$

where the matrices $C_x(x, y)$ and $C_y(x, y)$ represent the slope-dependent measurement errors in the x and y directions, respectively, at each pixel (x, y). Writing this system of equations in matrix form gives $$AX = B \quad (4a)$$

with the solution:

$$X = (A^T \cdot A)^{-1} \cdot A^T \cdot B \quad (4b)$$

where the matrix A is a function of (x, y)

$$A(x, y) = \begin{bmatrix} 1 & \frac{\partial n_1(x, y)}{\partial x} & \frac{\partial n_1(x, y)}{\partial y} \\ 1 & \frac{\partial n_2(x, y)}{\partial x} & \frac{\partial n_2(x, y)}{\partial y} \\ 1 & \frac{\partial n_3(x, y)}{\partial x} & \frac{\partial n_3(x, y)}{\partial y} \\ 1 & \frac{\partial n_4(x, y)}{\partial x} & \frac{\partial n_4(x, y)}{\partial y} \end{bmatrix} \quad (4c)$$

The vector X of the unknowns is:

$$X(x, y) = \begin{bmatrix} S(x, y) \\ C_x(x, y) \\ C_y(x, y) \end{bmatrix} \quad (4d)$$

And the right-hand side (the "measurements") B is given by:

$$B(x, y) = \begin{bmatrix} n_1(x, y) - T_1(x, y) \\ n_2(x, y) - T_2(x, y) \\ n_3(x, y) - T_3(x, y) \\ n_4(x, y) - T_4(x, y) \end{bmatrix} \quad (4e)$$

For this linear model, at least three measurements at three different orientations of the reference optic with respect to the test object are required, to simultaneously solve for the three unknowns $S(x, y)$, $C_x(x, y)$ and $C_y(x, y)$. The linear assumption is less valid for smaller magnitude errors described by rigid-body "astigmatism," "power," and "spherical" aberration, and for improved accuracy the models described may be expanded to include higher-order dependence, potentially with an increased number of measurements as needed to arrive at a unique solution.

It is important to notice that the formulas (4) are valid for every pixel with the coordinates (x, y), i.e., the system of equations is solved for every pixel within the mask. When the solution is calculated, we know the surface topography $S(x, y)$ which is "free" of retrace errors to the accuracy with which the model describes this dependency. We also find the matrices $C_x(x, y)$ and $C_y(x, y)$ which from now on can be used to correct further measurements.

$$S(x, y) = n(x, y) - T(x, y) - \frac{\partial n(x, y)}{\partial x} \cdot C_x(x, y) - \frac{\partial n(x, y)}{\partial y} \cdot C_y(x, y) \quad (5)$$

Whereas the calculation of the solution eq. (4b) is time consuming, as it must be performed for every pixel within the mask, the calculation of eq. (5) is straightforward and very fast, even when it also must be calculated for every pixel within the mask. $T_i(x, y)$ is the result of a fitting procedure that is very fast;

$$\frac{\partial n(x, y)}{\partial x}$$

and $$\frac{\partial n(x, y)}{\partial y}$$

are the two vector components of the gradient in the measured path-length deviation, and $C_x(x, y)$ and $C_y(x, y)$ are correction "matrices" that describe the additional optical path-length deviation due to slope-dependent aberrations. These correction matrices are a function of the specific transmission sphere (TS) design as well as of the radius of curvature of the spherical test object. The individual production imperfections are corrected by the matrices $C_x(x, y)$ and $C_y(x, y)$ in addition, but have smaller magnitude than the aberrations due to the design.

For the testing of plane surfaces, no TS is needed; in this case, equation (2a) is used for $T(x, y)$. Furthermore, the magnitude of the correction matrices $C_x(x, y)$ and $C_y(x, y)$ is much smaller in the case of a plane surface and, in the case of planar surfaces, it is not necessary to perform the "calibration" again with each new test object. Since the radius of curvature is always infinity and there is no TS lens, correction matrices $C_x(x, y)$ and $C_y(x, y)$, once calculated, are still valid as long as the same magnification is used (zoom-setting in case that the mainframe has zoom capability for the imaging of the test surface) and cavity length is approximately maintained.

For understanding of the mechanism of the equations above, the spatial derivatives $$\frac{\partial n(x, y)}{\partial x}$$

and $$\frac{\partial n(x, y)}{\partial y}$$

and are calculated using large amounts of tilt, and these tilts are different for each measurement at the different beam spot positions. The high amount of tilt is introduced by tilting the test object or reference optic. Additionally, the different tilts generate the carrier frequencies, which may be used for conversion of the intensity to phase. Due to the different tilt components in the measurements obtained at the different beam spots, the determinant of the "normal matrix" $N = A^T \cdot A$, which must be inverted for the solution, is not close to zero. That is, the numerical problem in separating $S(x, y)$, $C_x(x, y)$ and $C_y(x, y)$ is very well conditioned. Note further, the high amount of different tilt associated with the different fringe carrier frequencies obtained at the different beam spot positions is compensated at the right hand side of equation (3) nearly completely by the subtraction of the different "tilted planes" $T_i(x, y)$, with i=1..4 (e.g., for 4 different measurement positions). Therefore, besides the constant surface topography $S(x, y)$, the right hand sides of equation (3) contain the optical path length effects which are dependent on the tilt in the mainframe and the TS lens (including the sign), but do not include the rigid-body tilt-effect in the Fizeau cavity. These remaining effects are mainly Coma-like aberrations, and in addition a smaller amount of Astigmatism-like, power-like, and spherical-like aberrations in decreasing magnitude. Tilt as caused by tilt is ignored; only the "higher harmonics" are investigated. That is, since tilt is already subtracted from the measurement, tilt compensation is ignored in the characterization of Cx and Cy.

The interpretation of the equations (3) is that the parts of the optical path-difference that do not depend on the tilt components are captured by $S(x, y)$, whereas parts in the optical path difference that are dependent on tilt are captured by $C_x(x, y)$ and $C_y(x, y)$.

Having established the correction matrices $C_x(x, y)$ and $C_y(x, y)$, the result of a measurement using equation (5) is now much more accurate than in common, phase-shifting Fizeau interferometry with an optimally "nulled" cavity, in those cases when a test-surface by itself generates a large amount of slope, as is the case for mild aspheric surfaces, tested directly without optical compensation. The retrace error correction may be extended to any number of calibration tilt positions, depending on the system of equations chosen for calibration, with increasing precision and reliability in the calibration.

Alternative In Situ Calibration

The foregoing examples are directed to operation of an interferometer using a fixed carrier fringe frequency. However, in some implementations, it can be useful to provide a selection of multiple predefined carrier fringe frequencies and orientations for performing the interferometer calibration, where the user is not constrained by the carrier fringe frequency defined by the aperture stop. For example, in some implementations, an interferometer system can include a reticle that is previously calibrated and positioned for a number of desired carrier fringe spatial frequencies and orientations. The fringe frequency can be defined in terms of pixels per fringe.

In some instances, the reticle can be included in an interferometer system as a separate piece coupled to alignment detector 170 or as a part of alignment detector 170. For example, in some implementations, the reticle can be a diffuse screen having a pattern formed on its surface (e.g., an ink-based pattern) located at the focal plane of the measurement and reference beam spots. The diffuse screen is then imaged by a lens onto alignment detector 170. In some implementations, a software reticle generated by computer 190 may overlay the image output by detector 170. Alternatively, the displayed reticle may include a combination of a diffuse screen and a software overlay. The pattern on the reticle may include a crosshair for aiding alignment of a measurement beam spot or reference beam spot. During operation of the interferometer, a user can then align the measurement beam spot or reference beam spot to the center of a reticle crosshair such as would normally be done for an on-axis phase shift interferometry (PSI) measurement before performing a measurement.

In an example operation that utilizes a software generated reticle overlay, a user initiates a measurement command, after which a graphical user interface is displayed. The user interface displayed on the screen presents the user with a rough alignment window showing the alignment camera view with a computer generated image of a reticle overlay. In some implementations, the computer generated reticle has been previously calibrated and positioned for a desired carrier fringe spatial frequency and orientation. For example, a user may be given the option of selecting a carrier fringe frequency from a list of frequencies (represented as pixels per fringe) stored in memory, such as anywhere between 4 to 16 pixels per fringe. Other carrier frequencies are possible as well.

Figure 6:
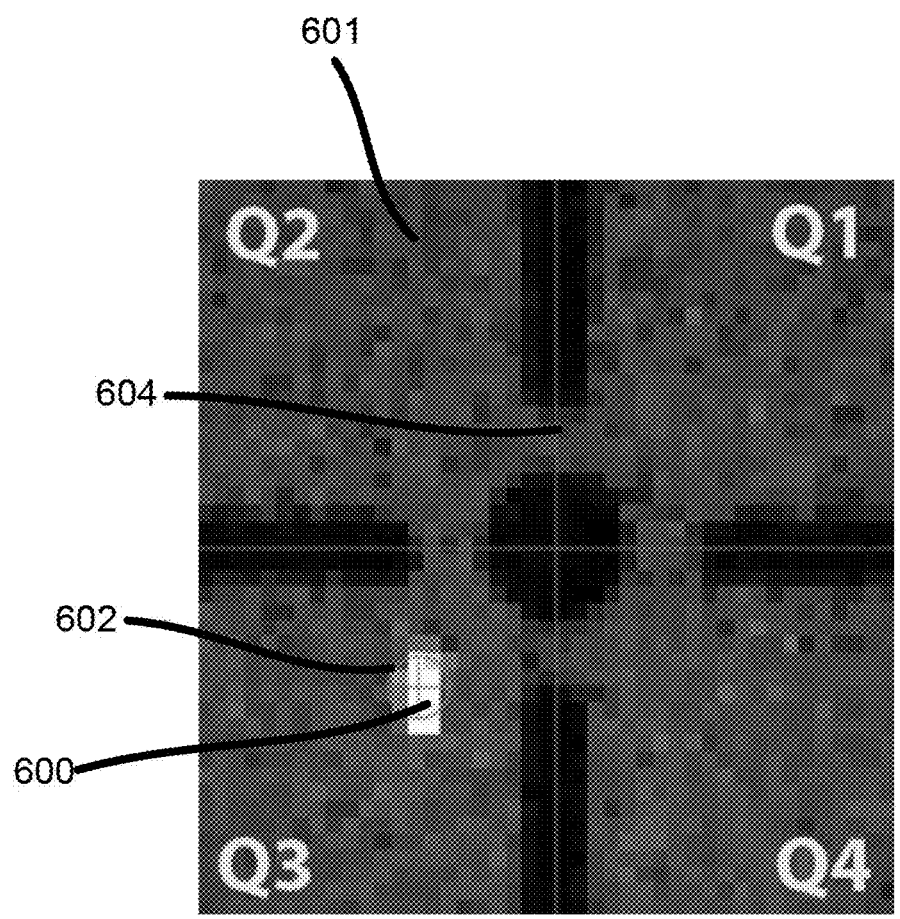
FIG. 6 is a photograph image of an alignment window and reticle overlay.

An example image of the alignment window and reticle overlay is shown in FIG. 6. As shown in FIG. 6, a measurement beam spot 600 is visible within an alignment window field of view 601. In the present example, a computer generated graphical grid display 604 overlays the field of view 601. The reticle 602 is presented as a cross-hair. The user can tilt either the reference optic or test object so as to center the beam spot under target reticle 602. After alignment of the beam spot within reticle 602 and/or measurement of a phase map, the computer may display a new reticle position within the same quadrant or a different quadrant for further measurements.

Preferably, only a single beam spot (measurement beam spot or reference beam spot) is displayed to avoid user confusion or to enable automated processing of the image to verify rough alignment in the correct alignment quadrant. Obscuration of the undesired beam spot return can be accomplished by:
1. Including a diffuse screen that includes a physical obscuration and which is imaged by the alignment camera (An example of this technique can be found in U.S. Pat. No. 4,201,473, which is incorporated herein by reference in its entirety. In that example, a diffuse alignment screen includes an ink overlay, and a CCD with Camera lens is used to view the alignment screen electronically); or
2. Applying a computer generated acquisition mask to the acquired image that replicates a reticle and applies NaN values to any pixels overlaid by the reticle.

Diffuse screen also may offer other advantages. For example, in some implementations, the diffuse screen can provide a larger detected area than could be obtained using a CCD detector alone. Alternatively, or in addition, the diffuse screen with ink overlay can, in certain implementations, provide a central dot that prevents CCD blooming when the intensity of the beam spots aligned at opening 181 becomes too bright had the beam spots been imaged directly onto the CCD.

In some implementations, reticle positioning automatically takes into account a standard system stop diameter, current zoom, and central obscuration to optimize the targeted fringe carrier frequency for maximum resolution while staying within the proper bounds of the field stop diameter 180. In some implementations, calculation of the target reticle location 602 requires knowledge of imaging relay magnification(s) and imaging ocular 125 focal length to convert a selected carrier fringe frequency into x,y pixel coordinates at the alignment detector 170. The computer can then store, in memory, one or more calculated targeted fringe carrier frequencies. Accordingly, when a computer generated reticle is employed during calibration, the reticle may be positioned on the display according to any one of the previously calculated fringe carrier frequencies.

Confirming and insuring the proper data sign (i.e., the correct tilt direction) can be accomplished by sub-dividing the alignment window into four quadrants (see, for example, FIG. 6). Using standard image processing techniques, the calibration program monitors a region matching the size of the system aperture stop, detects the beam spot within the alignment image, and determines the spot's location. When the beam spot is determined to be in the wrong location (e.g., wrong quadrant), the calibration program directs (e.g., by displaying a notification on the screen) the user back to a rough alignment procedure for proper alignment. The calibration program monitors the data sign at each step to guard against the possibility of the user wandering to the wrong side of a standard circular aperture stop.

The above described operations may be enabled using a manual procedure with feedback to the user, or alternatively, using automated controls. The calibration and alignment operations described above can be implemented with the aid of data processing hardware or software or a combination of both. The methods can be implemented in computer programs using standard programming techniques following the method and figures described herein. Program code is applied to input data to perform the functions described herein and generate output information. The output information is applied to one or more output devices such as a display monitor. Each program may be implemented in a high level procedural or object oriented programming language to communicate with a data processing system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a data processing apparatus, such as a general or special purpose programmable computer, for configuring and operating the data processing apparatus when the storage media or device is read by the data processing apparatus to perform the procedures described herein. The computer program can also reside in cache or main memory during program execution. The analysis method can also be implemented as a computer-readable storage medium, configured with a computer program, where the storage medium so configured causes a data processing apparatus to operate in a specific and predefined manner to perform the functions described herein.

The term "data processing apparatus" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

Although the foregoing teachings relate to an embodiment of the invention that employs carrier fringe techniques for wavefront and surface profile analysis, one skilled in the art would readily recognize that the same teachings would apply to any interferometric system for which a correction for systematic retrace errors would provide an advantage.

Other embodiments are within the claims.

What is claimed is:

1. An interferometer system comprising:
    a detector configured to obtain interferometry data from a test object surface;
    a data processing apparatus coupled to the detector, the data processing apparatus being configured to:
        obtain a sequence of phase map measurements of the test object from the detector, each of the measurements having a same carrier fringe frequency, where at least some of the measurements are made at three or more different orientations of carrier fringes; and
        determine information about the test object based on at least some of the phase map measurements, wherein determining the information comprises reducing errors in the measurements arising from imperfections in the interferometer system based on the measurements made at the three or more different orientations.

2. The interferometer system of claim 1, further comprising an adjustable aperture stop, wherein the data processing apparatus is further configured to control a position of the adjustable aperture stop to provide the different orientations of the carrier fringes.

3. The interferometer of claim 2, wherein the adjustable aperture stop comprises a first opening for passing a first beam reflected from the test object and a second opening for passing a second beam reflected from a reference surface.

4. The interferometer of claim 3, further comprising an alignment detector configured to image the first beam and the second beam.

5. The interferometer of claim 4, wherein the data processing apparatus is further configured to change the position of the adjustable aperture to sequentially pass the first beam in different positions of a field of view of the alignment detector.

6. The interferometer of claim 3, wherein the data processing apparatus is further configured to:
    output the field of view of the alignment detector to a display;
    generate a graphical user interface; and
    overlay the graphical user interface on the displayed field of view.

7. The interferometer of claim 1, wherein the interferometer is a Fizeau interferometer.

8. The interferometer of claim 7, further comprising a reference optic for forming a Fizeau cavity, wherein the reference optic comprises a planar surface, a spherical surface, or an aspherical surface.

9. The interferometer of claim 1, further comprising a first mount to support the test object and a second mount to support a reference optic, wherein an orientation of at least one of the first mount or the second mount is adjustable.

10. The interferometer system of claim 1, wherein reducing errors in the measurements comprises calibrating the interferometer for the imperfections based on the measurements made at the three or more different orientations.

11. The interferometer system of claim 1, wherein reducing the errors comprises combining measurements having the differing fringe orientations to reduce retrace errors.

* * * * *